Figure 4:
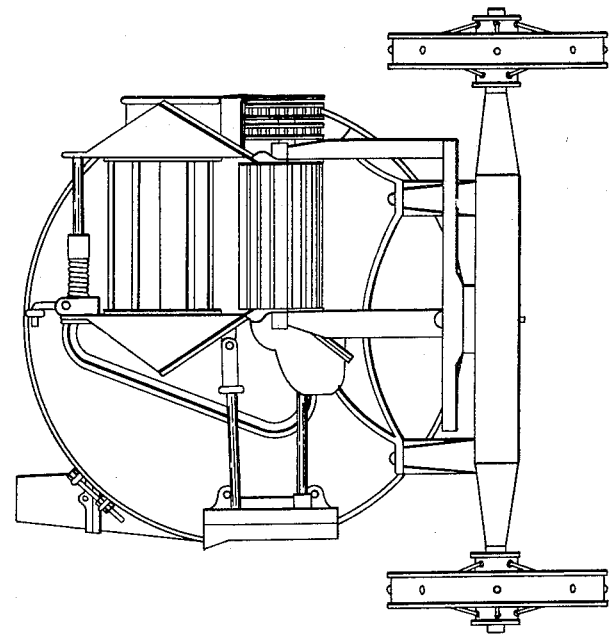

Nov. 28, 1933.  V. MATEJCIK  1,937,351
FODDER CUTTER
Filed Feb. 24, 1931  3 Sheets-Sheet 1
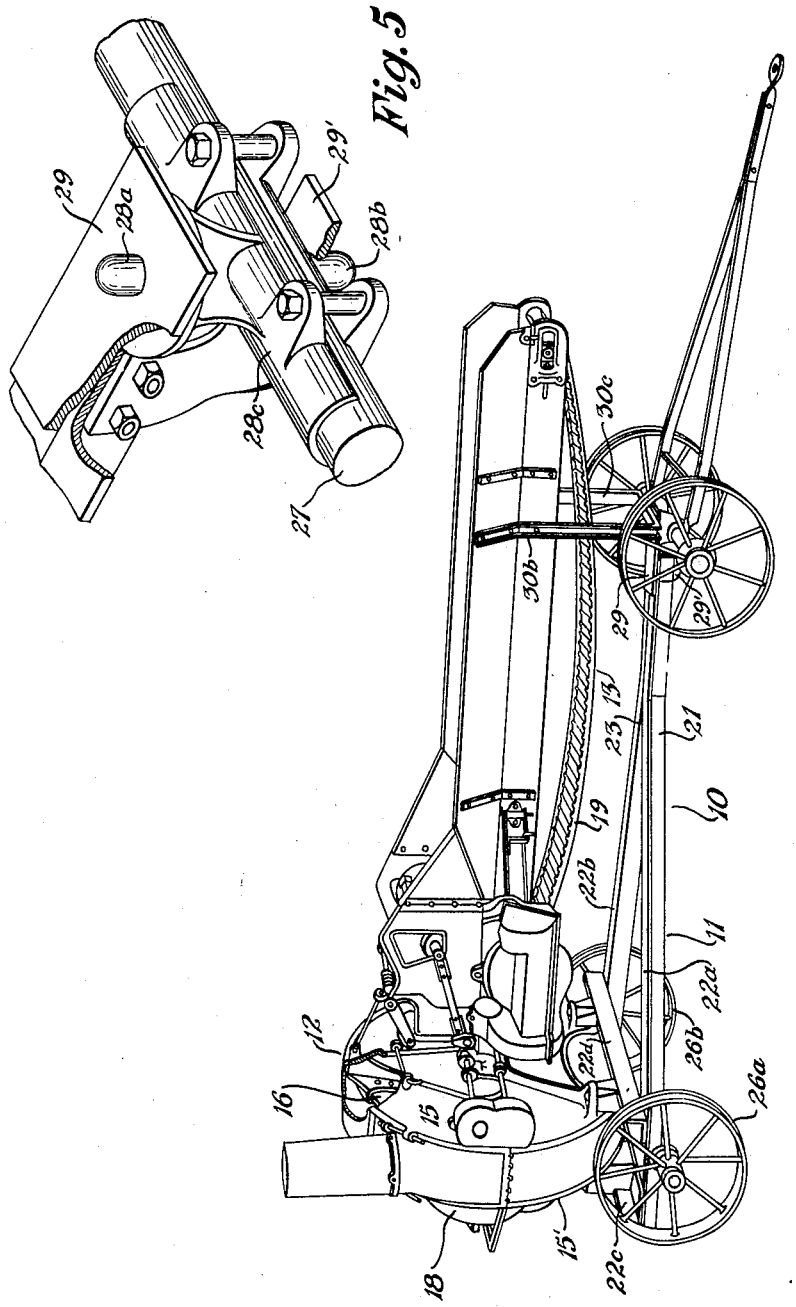
Inventor
V. Matejcik
By Frease and Bishop
Attorneys

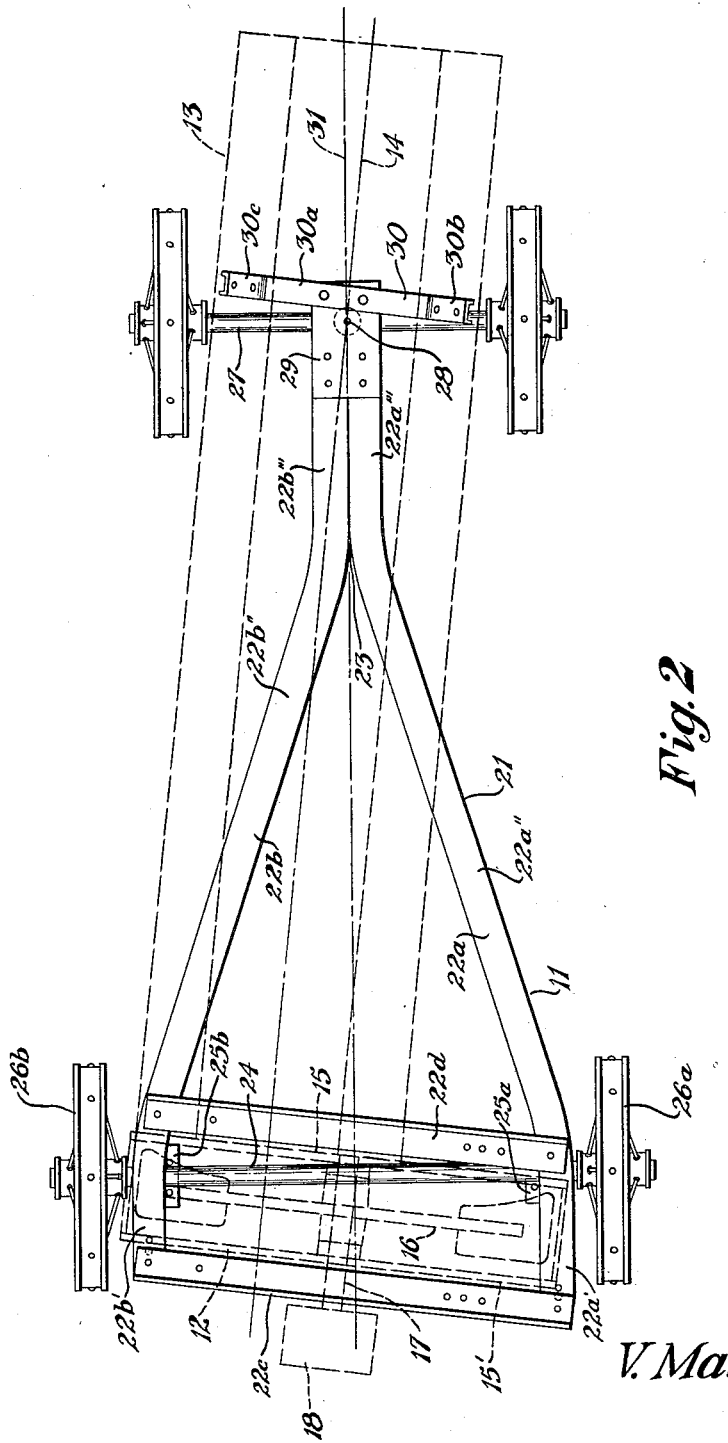

Nov. 28, 1933.        V. MATEJCIK         1,937,351
FODDER CUTTER
Filed Feb. 24, 1931        3 Sheets-Sheet 3

Inventor
V. Matejcik
By Frease and Bishop Attorneys

Patented Nov. 28, 1933

1,937,351

UNITED STATES PATENT OFFICE 1,937,351

FODDER CUTTER

Vincent Matejcik, Canton, Ohio, assignor to Blizzard Manufacturing Company, Canton, Ohio, a corporation of Ohio Application February 24, 1931. Serial No. 517,926

5 Claims. (Cl. 146—107)

My invention relates to cutters more particularly adapted for use by farmers for cutting fodder, ensilage, and the like, and such cutters usually include a cutting and blower wheel mounted for rotation in a blower case, the case having a throat inlet opening formed therein at one side of the axis of rotation of the wheel, and a longitudinal and preferably horizontally extending traveling feed apron or conveyer terminating at one end at the throat opening and extending therefrom preferably parallel with the axis of rotation of the blades, the cutting wheel conveyer, and other parts being operatively connected with each other by suitable gearing for being driven by a single source of power, and the foregoing operating parts being supported on a wheeled truck or chassis for enabling easy movement of the cutter from one location to another.

In order to attain the best operation of the cutter, it is desirable if not essential that the material to be cut shall be fed perpendicularly to the cutting blades.

In other words the traveling apron or conveyer should extend parallel with the axis of rotation of the blades which heretofore has usually coincided with the longitudinal median axis of the truck.

Accordingly the apron has heretofore been offset laterally from the longitudinal axis of the truck causing undesirable eccentric loading of the truck, and with the result that an auxiliary prop is usually required to be placed beneath the outside of the apron when the machine is in operation.

The objects of the present improvements include the provision of a novel fodder cutter in which the truck, conveyer, casing, and other parts are so arranged as to substantially eliminate the aforesaid eccentric loading of the truck.

The foregoing and other objects are attained by the apparatus, parts, improvements, and combinations which comprise the present invention, and which are particularly and distinctly pointed out and set forth in the appended claims forming part hereof.

In general terms the improved fodder cutter of the present invention includes a truck comprising a frame with a pair of rear wheels journalled on a rear axle fixed to the rear end of the frame and a pair of front wheels journalled on a front axle which is kingbolt connected to the frame at the center of the forward end thereof, and a blower casing and longitudinally extending conveyer with other necessary parts are supported on the truck frame so that the vertical plane containing the longitudinal median axis of the conveyer intersects the longitudinal median axis of the truck frame preferably adjacent the kingbolt, and the blower casing and parts mounted upon and therein are supported on the rear end of the frame, preferably directly over the rear axle, the longitudinal axis of the conveyer being preferably at right angles to the plane of rotation of the cutter blades in the blower casing, with a consequent angling of the longitudinal axis of the conveyer with respect to the longitudinal axis of the frame, and an angling of the blower casing with respect to the rear axle.

Figure 3:
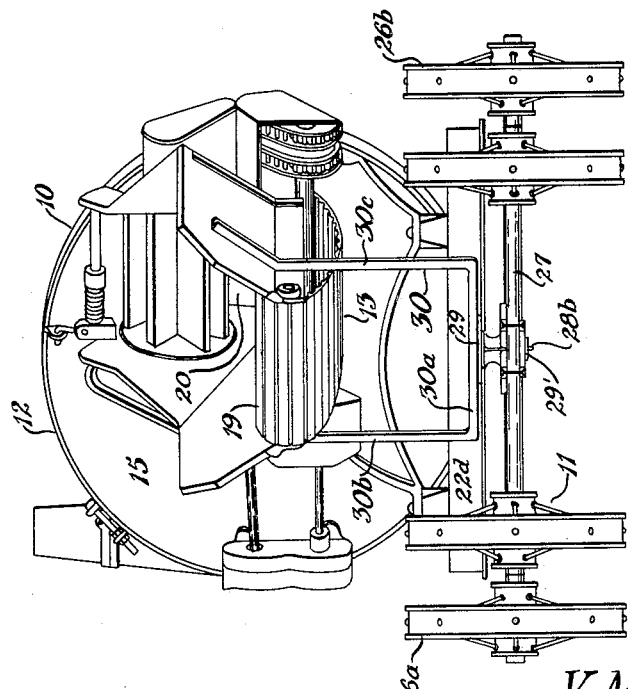

A preferred embodiment of the invention is illustrated in the accompanying drawings forming part hereof, in which Figure 1 is a perspective view of a fodder cutter embodying the present improvements;

Fig. 2, a top plan view of the improved truck therefor, with the cutter knives, blower casing, and conveyer indicated diagrammatically in dash lines;

Fig. 3, an end elevation of the improved fodder cutter;

Fig. 4, a view similar to Fig. 3 illustrating the usual arrangement of the parts of a fodder cutter; and Fig. 5, an enlarged fragmentary isometric view illustrating the preferred mounting connection of the front axle with the frame of the truck.

Similar numerals refer to similar parts throughout the several views.

The improved fodder cutter is indicated generally at 10 and includes a truck indicated generally at 11, a blower and cutter wheel case indicated generally at 12, and a traveling feed apron or conveyer indicated generally at 13, the case 12 and conveyer 13 being associated with each other and with other usual parts of a fodder cutter, preferably so that the longitudinal axis 14 of the conveyer 13 is at right angles with the parallel front and rear plates 15 and 15' of the casing 12.

Within the casing 12 a cutter wheel 16 is secured on a shaft 17 indicated diagrammatically in dash lines in Fig. 2, and the shaft 17 is journalled in the case plates 15 and 15' and one end of the shaft 17 extends through the rear plate 15' on the outside of which a drive pulley 18 is secured on the shaft 17 for receiving power for the cutter, as by means of a power driven belt, not shown.

The shaft 17 is operatively connected in any well known manner, as by gearing, with the other parts of the cutter for driving the belt 19 of the conveyer 13, there being a throat opening 20 formed in the front plate 15 of the casing 12, through which opening 20 the material to be cut is introduced into the interior of the casing 12 by operation of the conveyer in a well known manner.

The truck 11 includes a frame 21, and the frame 21 is preferably of the construction and arrangement best illustrated in Figs. 1 and 2, and includes longitudinally extending side members 22a and 22b which are parallel and laterally spaced from each other at rear portions 22a' and 22b' and extend forwardly therefrom towards each other in angled portions 22a'' and 22b'' to a forward junction at 23 from which they extend preferably in side by side abutment with each other in portions 22a''' and 22b''', which are parallel with the rear portions 22a' and 22b'.

The rear axle 24 is located beneath and angular to the casing and extends transversely of and perpendicular to the rear frame side portions 22a' and 22b', and is secured thereto as by means of clamp plates 25a and 25b.

On the outside of the frame side members, rear wheels 26a and 26b are journalled on the axle 24.

A front axle 27 having laterally spaced wheels journalled thereon, is operatively connected with the forward end of the frame side portions 22a''' and 22b''' for pivoting about a vertical axis midway between the ends of the front axle 27, preferably as by means of a vertical stub shaft 28 secured to the axle 27, and journalled in upper and lower bearing plates 29 and 29' secured to the frame side members at the front ends thereof.

The axle 27 is preferably tubular as illustrated and the stub shaft 28 preferably has upper and lower shaft extremities 28a and 28b and a central yoke portion 28c engirdling and clamping the axle 27, as best illustrated in Fig. 5.

A pair of longitudinally spaced frame cross members 22c and 22d are secured at their ends to the rear portions of the frame side members 22a and 22b, preferably adjacent the rear axle 24 as illustrated, and the cross members 22c and 22d being preferably angled with respect to the rear axle 24 for the purposes of the present invention.

An upwardly opening yoke 30 is secured at the forward end of the frame 21, preferably adjacent the stub shaft 28, and includes a yoke cross member 30a and upwardly extending yoke side members 30b and 30c, the side members extending upwardly at equal distances from the longitudinal axis 31 of the frame 21, and the cross member 30a being preferably parallel with the frame cross members 22c and 22d.

The casing 12 is supported upon the frame cross members 22c and 22d, and the forward end of the conveyer 13 is supported on the upper ends of the yoke 30, the rear end of the conveyer 13 being connected with and supported by the casing adjacent the throat opening 20 therein.

Accordingly by the foregoing construction and arrangement the vertical plane containing the longitudinal axis 14 of the conveyer 13 intersects the longitudinal axis 31 of the frame 21, and the intersection is preferably adjacent the king bolt or stub shaft 28, and more preferably the intersection falls upon the vertical axis of the king bolt or stub shaft 28, as best illustrated in Fig. 2.

I claim:

1. A machine, for cutting fodder and the like, including a casing having a laterally extending front plate, and a conveyer secured at one end to the front plate and extending longitudinally therefrom at right angles to the front plate, a truck including a longitudinally extending frame, means supporting the casing at one end of the frame, and means supporting the outer end of the conveyer at the other end of the frame, the vertical plane containing the longitudinal axis of the conveyer being angular to and intersecting the longitudinal axis of the frame, one axle having laterally spaced wheels journalled thereon and the axle being secured to one end of the frame beneath and angular to the casing, a second axle having laterally spaced wheels journalled thereon, the second axle being operatively connected with the frame for rotating about a vertical axis, the vertical axis being located adjacent the intersection of the vertical plane containing the longitudinal axis of the conveyer with the longitudinal axis of the frame.

2. A machine, for cutting fodder and the like, including a casing having a laterally extending front plate, and a conveyer secured at one end to the front plate and extending longitudinally therefrom, a truck including a longitudinally extending frame, means supporting the casing at one end of the frame, and means supporting the outer end of the conveyer at the other end of the frame, the vertical plane containing the longitudinal axis of the conveyer being angular to and intersecting the longitudinal axis of the frame, one axle having laterally spaced wheels journalled thereon and the axle being secured to one end of the frame beneath and angular to the casing, a second axle having laterally spaced wheels journalled thereon, the second axle being operatively connected with the frame for rotating about a vertical axis, the vertical axis being located adjacent the intersection of the vertical plane containing the longitudinal axis of the conveyer with the longitudinal axis of the frame.

3. A machine, for cutting fodder and the like, including a casing having a laterally extending front plate, a cutter wheel operatively mounted within the casing, the front plate having a throat opening formed therein, and a conveyer secured at one end to the front plate adjacent the throat opening and extending longitudinally therefrom at right angles to the front plate, a truck including a longitudinally extending frame, means supporting the casing at one end of the frame, and means supporting the outer end of the conveyer at the other end of the frame, the vertical plane containing the longitudinal axis of the conveyer being angular to and intersecting the longitudinal axis of the frame, one axle having laterally spaced wheels journalled thereon and the axle being secured to one end of the frame beneath and angular to the casing, a second axle having laterally spaced wheels journalled thereon, the second axle being operatively connected with the frame for rotating about a vertical axis, the vertical axis being located adjacent the intersection of the vertical plane containing the longitudinal axis of the conveyer with the longitudinal axis of the frame.

4. A machine, for cutting fodder and the like, including a casing having a laterally extending front plate, a cutter wheel operatively mounted within the casing, the front plate having a throat opening formed therein, and a conveyer secured at one end to the front plate adjacent the throat opening and extending longitudinally therefrom, a truck including a longitudinally extending frame, means supporting the casing at one end of the frame, and means supporting the outer end of the conveyer at the other end of the frame, the vertical plane containing the longitudinal axis of the conveyer being angular to and intersecting the longitudinal axis of the frame, one axle having laterally spaced wheels journalled thereon and the axle being secured to one end of the frame beneath and angular to the casing, a second axle having laterally spaced wheels journalled thereon, the second axle being operatively connected with the frame for rotating about a vertical axis, the vertical axis being located adjacent the intersection of the vertical plane containing the longitudinal axis of the conveyer with the longitudinal axis of the frame.

5. A machine, for cutting fodder and the like, including a casing having a laterally extending front plate, a conveyer terminating at one end adjacent the front plate and extending longitudinally therefrom, a truck including a longitudinally extending frame, the frame and the casing and the conveyer end adjacent the casing front plate being associated with each other whereby the casing and the adjacent conveyer end are supported at one end of the frame, and means supporting the outer end of the conveyer at the other end of the frame, the vertical plane containing the longitudinal axis of the conveyer being angular to and intersecting the longitudinal axis of the frame, one axle having laterally spaced wheels journalled thereon and the axle being secured to one end of the frame beneath and angular to the casing, a second axle having laterally spaced wheels journalled thereon, the second axle being operatively connected with the frame for rotating about a vertical axis, the vertical axis being located adjacent the intersection of the vertical plane containing the longitudinal axis of the conveyer with the longitudinal axis of the frame.

VINCENT MATEJCIK.